(12) United States Patent
Aritomi

(10) Patent No.: US 6,445,462 B2
(45) Date of Patent: *Sep. 3, 2002

(54) OUTPUT CONTROL METHOD AND APPARATUS, AND OUTPUT SYSTEM

(75) Inventor: Masanori Aritomi, Kisarazu (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/825,598

(22) Filed: Apr. 1, 1997

(30) Foreign Application Priority Data

Apr. 8, 1996 (JP) .............................. 8-085532

(51) Int. Cl.$^7$ ........................... H04N 1/60; G06K 15/02
(52) U.S. Cl. ........................ 358/1.9; 358/518; 358/522
(58) Field of Search ................................ 382/171, 169, 382/167, 162, 164, 168; 358/522, 504, 1.9, 501, 518, 520; 395/112, 109; 345/431

(56) References Cited

U.S. PATENT DOCUMENTS

| | | | |
|---|---|---|---|
| 4,963,898 A | 10/1990 | Kadowaki et al. | |
| 5,278,641 A * | 1/1994 | Sekizawa et al. | 358/527 |
| 5,315,691 A * | 5/1994 | Sumiya et al. | 358/1.9 |
| 5,355,441 A * | 10/1994 | Kawai et al. | 358/1.16 |
| 5,416,890 A * | 5/1995 | Beretta | 345/431 |
| 5,489,997 A * | 2/1996 | Usami | 358/522 |
| 5,748,773 A * | 5/1998 | Tashiro et al. | 382/169 |
| 5,822,503 A * | 10/1998 | Gass, Jr. et al. | 358/1.9 |
| 6,088,124 A | 7/2000 | Tanaka | 358/1.9 |

FOREIGN PATENT DOCUMENTS

| | | |
|---|---|---|
| JP | 1-184144 | 7/1989 |
| JP | 3-39649 | 2/1991 |

* cited by examiner

*Primary Examiner*—Scott Rogers
(74) *Attorney, Agent, or Firm*—Fitzpatrick, Cella, Harper & Scinto

(57) ABSTRACT

A printer is interrogated with regard to a plurality of processing functions thereof and, in response to the interrogation, response information is sent from the printer. An image object delivered from an application program is analyzed and, on the basis of the analytical results and the response information from the printer, it is determined whether the number of color elements and number of palettes of the image object are capable of being supported by the printer. If they are capable of being supported, control information for output to the printer is created based upon the image object. If the number of color elements and number of palettes are incapable of being supported by the printer, then control information for output to the printer is created from the original image object upon taking into consideration the functions possessed by the printer.

16 Claims, 14 Drawing Sheets

OUTPUT CONTROL METHOD AND APPARATUS, AND OUTPUT SYSTEM

BACKGROUND OF THE INVENTION

This invention relates to an output control method and apparatus and to a control system for creating data output to a peripheral device such as a printer, and then outputting the data to the peripheral device.

In a printing system having a host computer and a printer connected to the host computer via an interface (e.g. a Centronics interface), the printer analyzes print information that enters from the host computer and creates bitmap data as output data output to a printer engine. The printer modulates a laser beam, for example, on the basis of the bitmap data thus created and scans the laser beam across a photosensitive drum to expose the drum and record an image.

In a case where the host computer has a printer emulation function, the printer is so adapted that it can process a plurality of print control languages. In accordance with an application program run by the user, printing processing can be executed while the printer is switched between the emulation mode and an ordinary mode. In this case, the printer is provided with a switch for changing over the printer control language and with a card slot used to instruct the changeover.

In a case where the image processing means in this conventional printer is fixed, the image data output to the printer are transmitted upon being converted to a format suited to the fixed processing means. Further, in a case where the printer has a plurality of image processing means, the image data are changed to data having a data format conforming to one of these image processing means before being transferred from the host computer.

Consequently, the following problems are encountered with the conventional printing system described above:

(1) Since the data sent to the printer have a single data format, the original image data, even if it is highly efficient in terms of content, cannot be transmitted to the printer as is.

(2) Since the data sent to the printer have a single data format, the data are sent to the printer as is even when the data are inefficient in terms of content (i.e. even when the data has a high degree of redundancy).

(3) Since the format of the data sent to the printer is fixed, the format of the data transferred cannot be changed in conformity with the content of the image data output to the printer.

(4) Since the data necessary to select the format of the data sent to the printer are fixed, control conforming to the functions possessed by the printer cannot be carried out.

SUMMARY OF THE INVENTION

Accordingly, an object of the present invention is to provide an output control method and apparatus as well as an output system in which, when image data sent to an output unit or output device are highly efficient, the image data are sent to the output unit or output device as is, whereas image data that are inefficient are sent upon first being converted.

Another object of the present invention is to provide an output control method and apparatus as well as an output system in which transferred content can be constructed in conformity with the content of image data and selection of a data format can be performed automatically.

A further object of the present invention is to provide an output control method and apparatus as well as an output system in which data necessary for selecting data format are obtained from an output unit or output device, whereby control in conformity with the output unit or output device can be carried out.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

DESCRIPTION OF THE PREFERRED EMBODIMENT

A preferred embodiment of the present invention will be described in detail with reference to the accompanying drawings. Before discussing the construction of this embodiment, however, the construction of a laser printer well suited for applying the embodiment will be described with reference to FIGS. 1 through 4. It goes without saying that the printer to which this embodiment is applied is not limited to a laser printer or inkjet printer (described later); other types of printers may be employed as well.

Figure 1:
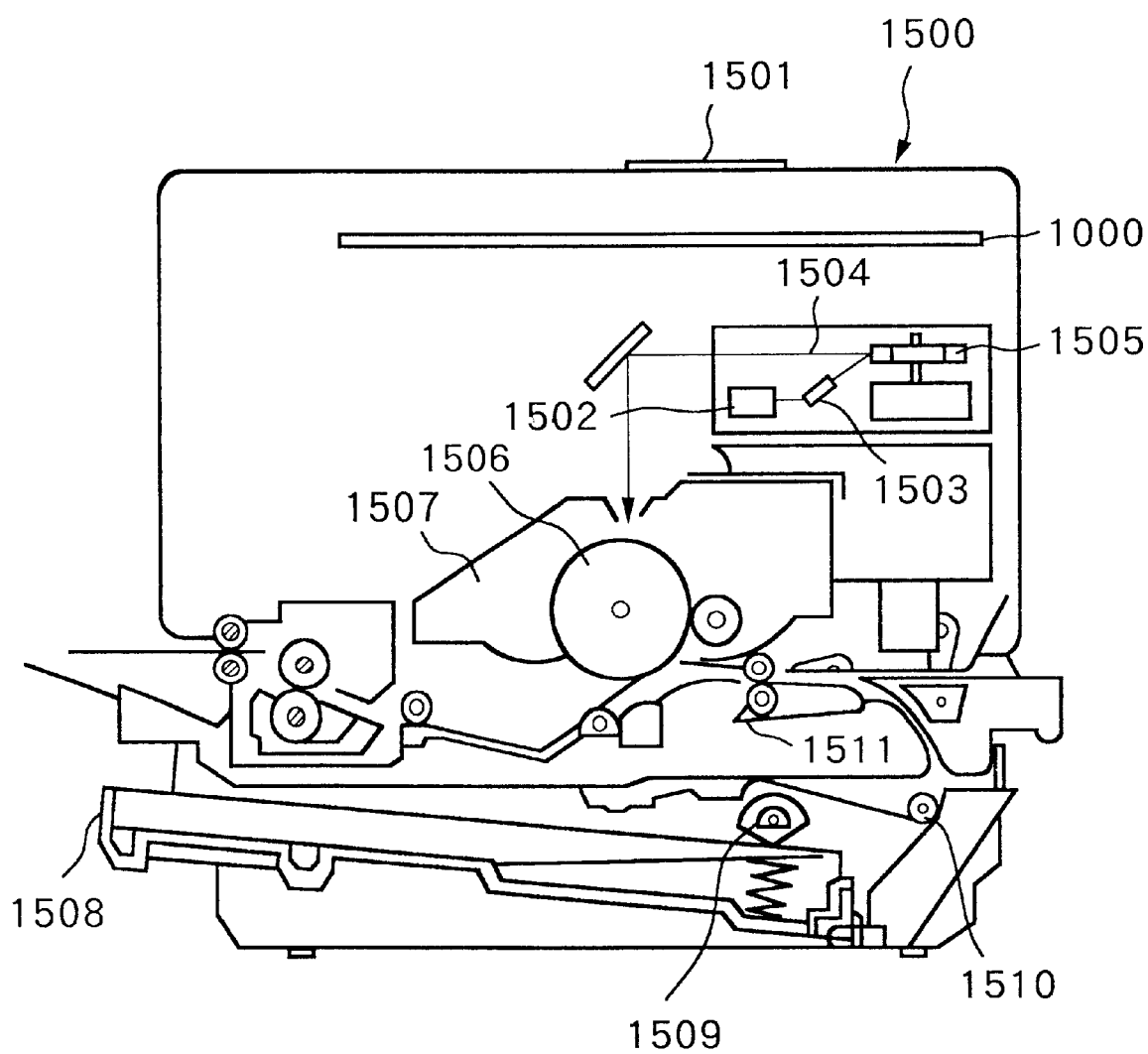
FIG. 1 is a structural sectional view showing the structure of a laser printer illustrating an example Of an output apparatus embodying the present invention.

FIG. 1 is a sectional view showing the structure of a laser printer illustrating a specific example of an output apparatus embodying the present invention.

Shown in FIG. 1 is a laser printer 1500 the inputs to which are print information (character codes, etc.), form information or macro instructions supplied by an externally connected host computer. The laser printer 1500 stores this information and, in accordance therewith, produces a corresponding character pattern or form pattern and forms the image on recording paper serving as a recording medium. A control panel 1501 includes switches manipulated by an operator and LED indicators or the like. A printer control unit 1000 performs overall control of the laser printer 1500 and analyzes character information and the like supplied by the host computer. The printer control unit 1000 mainly converts character information to a video signal of the corresponding character pattern and outputs the video signal to a laser driver 1502. The laser driver 1502 is a circuit for driving a semiconductor laser 1503. In conformity with a video signal applied thereto, the laser driver 1502 switches on and off a laser beam 1504 emitted from the semiconductor laser 1503. The laser beam 1504 is deflected back and forth by a rotating polygonal mirror 1505 so as to be scanned across an electrostatic drum 1506 to expose the surface thereof. As a result, an electrostatic latent image of a character pattern is formed on the electrostatic drum 1506. The latent image is developed by a development unit 1507 surrounding the electrostatic drum 1506, after which the image is transferred to the recording paper. Cut sheets of paper are used as the recording paper and are stored in a paper cassette 1508 loaded in the laser printer 1500. The cut sheets are introduced into the apparatus and supplied to the electrostatic drum 1506 by a feed roller 1509 and conveyance rollers 1510, 1511. Further, the laser printer 1500 has one or more card slots (not shown) that allow a card for optional fonts supplementing internal fonts or a control card (emulation card) for a different language system to be connected to the printer.

Figure 2:
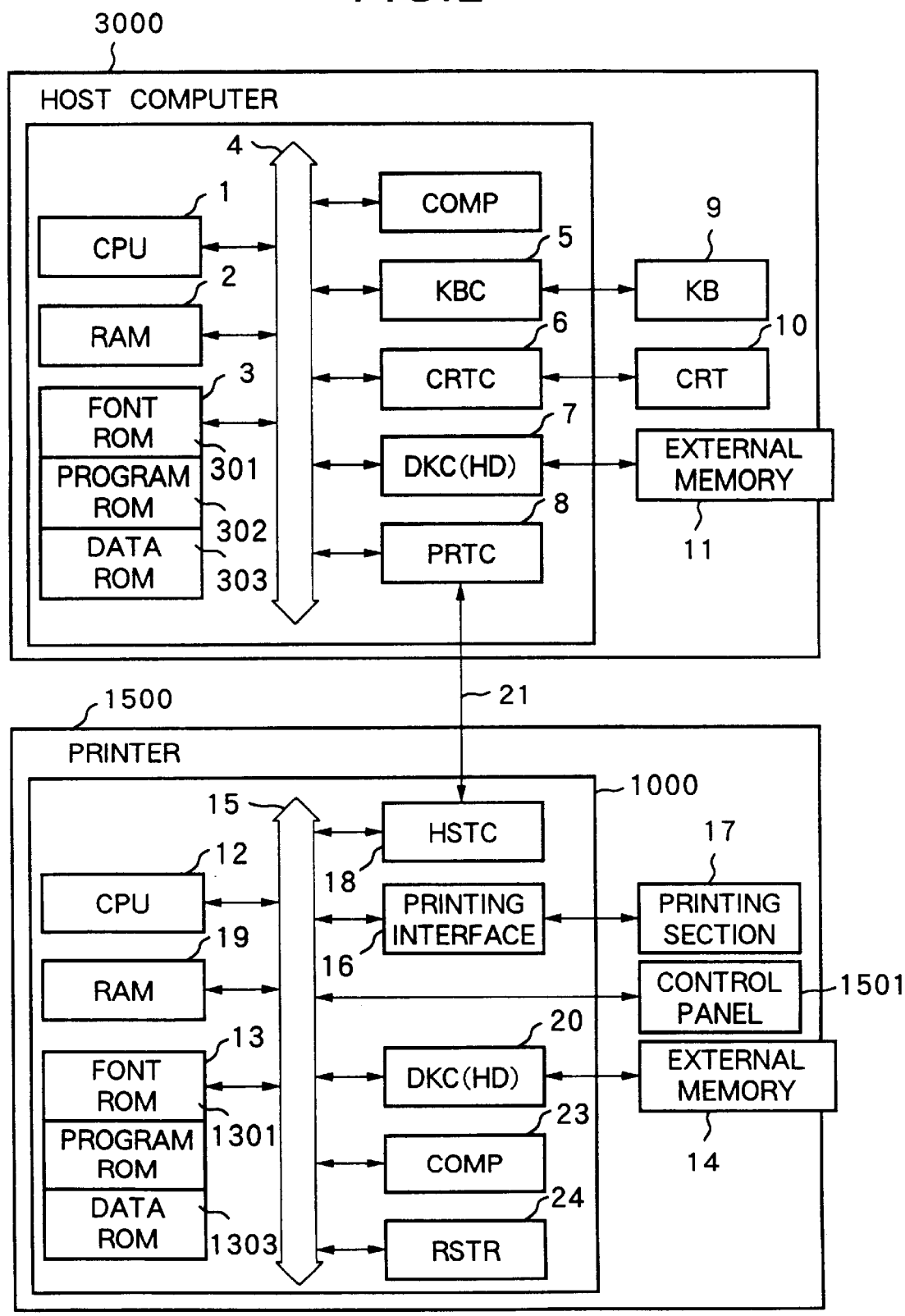
FIG. 2 is a block diagram showing the construction of a host computer and of a printer control unit in a printing system according to this embodiment.
Figure 3:
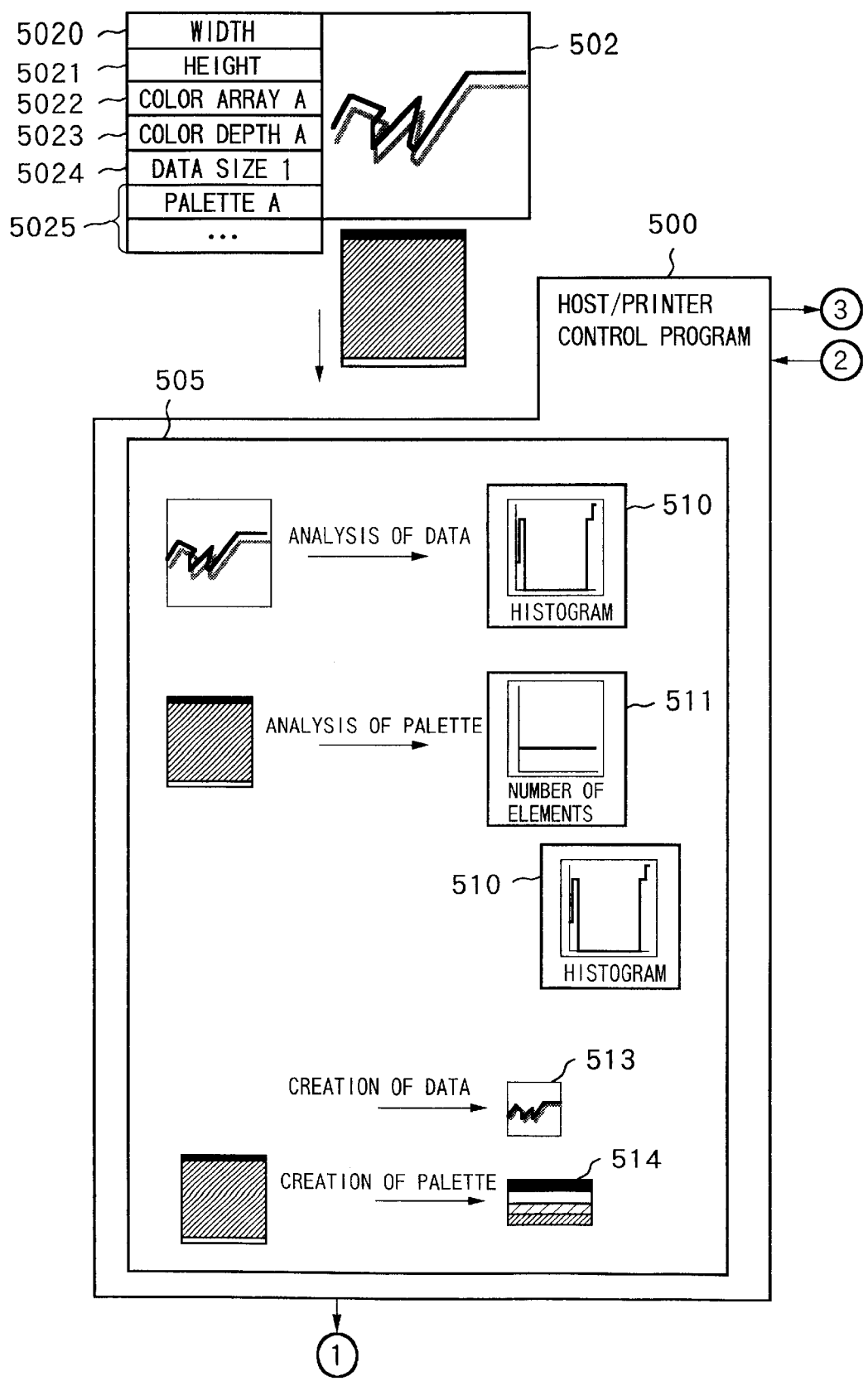
FIGS. 3 and 4 are conceptual views showing the general principles of processing in the printing system of this embodiment.
Figure 4:
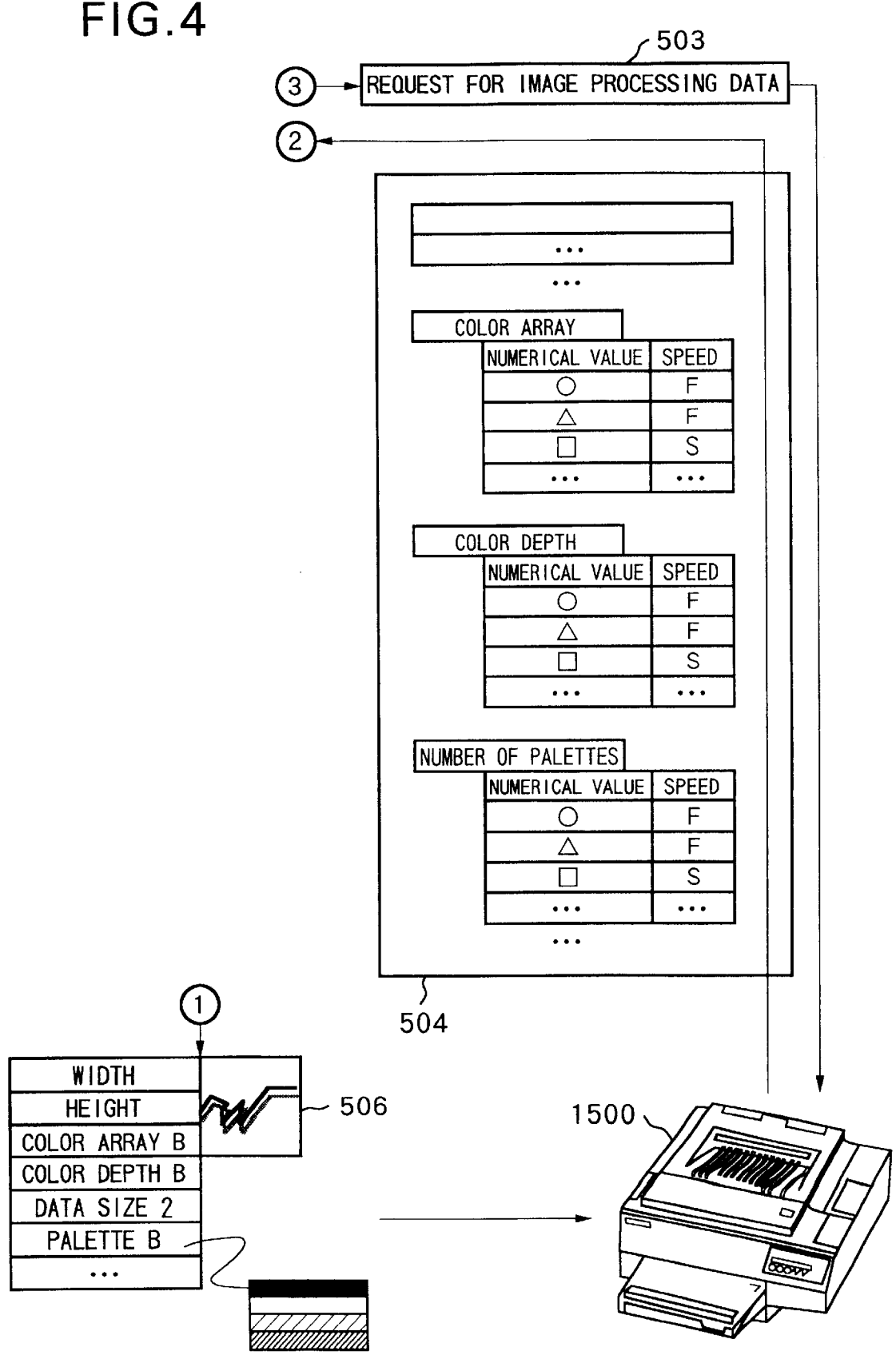

FIG. 2 is a block diagram showing the configuration of a printing system which includes the printer 1500 of this embodiment and a host computer 3000. FIG. 2 illustrates primarily the construction of the printer control unit 1000 of printer 1500 and the construction of the host computer 3000. So long as the functions of this embodiment can be executed, the present invention is applicable even if the arrangement is that of a stand-alone apparatus, a system comprising a plurality of apparatus, as in this embodiment, or a system in which processing is executed among a plurality of apparatus interconnected via a network such as a LAN.

As shown in FIG. 2, the host computer 3000 has a CPU 1 which, on the basis of a document processing program or the like that has been stored in a program ROM 302 of a ROM 3, executes document processing such as the creation and editing of document data consisting of a mixture of graphics, images, characters and tables (inclusive of table calculations). The CPU 1 implements overall control of devices connected to a system bus 4. A control program illustrated by a flowchart (FIGS. 9, 10), described later, and executed by the CPU 1 also is stored in the program ROM 302 of the ROM 3. Font data for generating character patterns by which edited and created document data are displayed on a CRT 10 at the time of the document processing mentioned above are stored in a font ROM 301 of the ROM 3. Various data (directory information, printer driver tables, for example) used when executing document processing and display processing, etc., are stored in a data ROM 303 of the ROM 3. A RAM 2 functions as the main memory and working area of the CPU 1. The control program executed by the CPU 1 may be stored in an external memory 11 such as a floppy disk or CD-ROM and then executed by the CPU 1 after being downloaded to the RAM 2 under the control of a disk controller (DKC) 7.

A keyboard controller (KBC) 5 controls key entry and data entry from a keyboard 9 and a point device (mouse, etc.), not shown. A CRT controller 6 controls the display presented on the CRT display (CRT) 10. The disk controller (DKC) 7 controls the accessing of the external memory 11, such as a hard disk (HD), floppy disk (DK) or CD-ROM, for storing a booting program, various applications, font data user files and edited files. A printer controller (PRTC) 8 is connected to the printer 1500 via a prescribed bidirectional interface 21 and executes processing for controlling communication with the printer 1500.

The CPU 1 executes processing for rasterizing outline fonts to a display RAM (VRAM) that has been established in, say, the RAM 2, thus making possible WYSIWYG (What You See Is What You Get) on the CRT 10. Further, the CPU 1 opens various registered windows and executes various data processing based upon commands specified by a mouse cursor or the like on the CRT 10.

Next, the construction of the printer control unit 1000 of printer 1500 will be described.

The printer 1500 includes a printer CPU 12 which, on the basis of a control program that has been stored in a program ROM 1301 of a ROM 13 or a control program stored in an external memory 14 and downloaded to a RAM 19, controls overall access to various devices connected to a system bus 15 and outputs an image signal as output information to a printing section (printer engine) 17 connected via a printing section interface (I/F) 16. Font data and the like used when output information delivered to the printer engine 17 is generated have been stored in the font ROM 1301 of the ROM 13. In case of a printer to which the external memory 14 such as a hard disk has not been connected, information utilized by the host computer 3000 is stored in a data ROM 1303 of the ROM 13.

A control program similar to that stored in the ROM 3 may be stored in the ROM 13, as in the manner of a control program illustrated by a flowchart described below. In such case the control program is transferred to the host computer 3000 when necessary. Further, the CPU 12 makes possible communication with the host computer 3000 via an input unit (HSTC) 18 and is designed so as to be capable of sending information from the printer 1500 to the host computer 3000. A RAM 19 functions as a main memory and working memory of the CPU 12 and is so designed that its memory capacity can be extended by an optional RAM connected to an extension port, not shown. The RAM 19 is used as an area in which output information is developed, an area in which environment data are stored and as an NVRAM. As in the case of the host computer 3000, the control program executed by the CPU 12 may be executed upon downloading it to the RAM 19 from the external memory 14.

The external memory 14, such as a hard disk, CD-ROM or IC card, has its access controlled by a disk controller (DKC) 20. The external memory 14, which is connected as an option, stores font data, an emulation program and form data, etc. The control panel 1501 includes switches, which are manipulated by the operator, and LED indicators, etc.

The external memory 14 is not limited to a single memory; more than one may be provided. It can be so arranged that a plurality of optional font cards, which supplement internal fonts stored in the font ROM 1301, and a plurality of external memories storing programs for interpreting printer control languages of different language systems can be connected. Furthermore, the external memory may have an NVRAM (not shown) for storing printer mode setting information entered from the control panel 1501. A compression/decompression controller (COMP) 23 compresses and decompresses data at high speed. The method of data compression supported and the processing speed differ depending upon the controller 23. A rasterization controller (RSTR) 24 rasterizes (converts to a bitmap) printing image data at high speed. The format of the rasterized data and the processing speed differ depending upon the type of the controller 24.

In the printer control system of this embodiment constructed as set forth above, an image object 502 (see FIG. 3) for which there is a print request from an application program is delivered from the application program to the printer control program executed by the host computer 3000. As a result, the printer control program converts the expression of the image-object control information to control information for controlling the printer 1500. In this case, if the control information of the image object 502 and the control information of the printer 1500 are identical, no particular problems arise. In this embodiment, it is assumed that a plurality of control procedures (e.g. COMP 23, RSTR 24, etc., of FIG. 2) possessed by the printer 1500 can be selected when the image control information for the printer 1500 is constructed. There is no problem in a case where the expression of the image-object control information is suited to image data output to the printer 1500. However, in a case where the expression of this control information is not suited to the printer 1500, information which is unnecessary from the viewpoint of printing quality or printing speed is transferred to the printer 1500. In other words, in such case the transfer processing will include some unnecessary processing.

Further, there is no problem in a case where selection of a plurality of control means is not affected by conditions. However, when the printer 1500 is provided with the COMP 23 or RSTR 24 to improve capability for specific control, cases arise in which the capability of the printer 1500 which responds to certain control means will be different from that usually assumed. Further, in a case of a configuration that differs for each printer or in case of a COMP 23 or RSTR 24 having different capabilities, the structure of the control information output to each printer becomes complicated and cases arise in which the capability of the printer 1500 which responds to the control information is not uniform.

Accordingly, when control information output to the printer 1500 is constructed in the host computer 3000, the printer control program may use the processing information so long as this information is in the RAM 2 or ROM 3 and external memory 11, etc. In this embodiment, however, processing is executed to request the printer 1500 for the processing information via the bidirectional interface 21, receive the response information and then construct the control information. In other words, the printer 1500 is requested via the PRTC 8 to transfer the control information group necessary for image object processing. As a result, the printer 1500 processes the configuration of the printer 1500 as well as information obtained from the ROM 13 or external memory 14 and RAM 19, etc., and transfers the control information group for processing to the host computer 3000 via the HSTC 18. The control information group for processing thus transferred includes features and capabilities attendant upon each result of selection, or the selection conditions, necessary for selecting the control means in the host computer 3000.

Even if all of the control information group for processing is not used, it is possible to check the nature of the image object, extract the processing control information necessitated by the nature of the image object and use this in constructing the control information of the printer 1500. The timing at which this processing information is sent and received does not particularly matter.

Processing executed in the printing system of this embodiment will now be described with reference to FIGS. 3 through 8.

An image object (source image) 502 for which there is a print request is delivered from an application program to a printer control program 500 of the host computer 3000. As a result, the printer control program 500 converts the expression of the control information of image object 502 to control information for controlling the printer 1500 and makes a transition to a stage 505. More specifically, the printer control program 500 starts processing to express the control information of the image object 502 as control information 506 (FIG. 4) of the printer 1500. It is assumed here that the printer 1500 is such that a plurality of control means can be selected, as mentioned above.

When the control information for the printer 1500 is constructed, the printer control program 500 executes processing for sending and receiving processing information to and from the printer 1500 via the interface 21. That is, a request 503 (FIG. 4) for image data processing is transmitted to the printer 1500. The request is for transfer of a control information group 504 necessary for processing of the image object 502. As a result, the printer 1500 responds to the request 503 by transferring the processing control information group (FIG. 4) to the host computer 3000. The processing control information group 504 includes capabilities, such as the color array, color depth and number of palettes necessary for selection of control means, as well as selection conditions that indicate which of these capabilities is to be selected.

On the basis of the control information group 504, the host computer 3000 makes a transition to stage 505, with the expression of the control information of the image object 502 being converted to that of the control information of printer 1500. First, the host computer 3000 analyzes the image object 502 for which the print request was issued. The image object 502 includes such information as image width 5020, height 5021, array of colors 5022, color depth 5023, data size 5024 and palette 5025 used. The host computer 3000 examines the image object 502 and creates a histogram (color value vs. number of elements, etc.) 510 thereof. Further, the host computer 3000 examines the palette data 5025 and creates a histogram (color value vs. number of elements, ID vs. number of elements, etc.), as indicated at 511. The host computer 3000 combines the results of analyzing the image object 502 and the processing information acquired from the printer 1500 and selects control means for developing the image in the printer 1500.

If control means agreeing with or suited to the content of the image object 502 for which printing has been requested exist in the printer 1500 and these control means of the printer 1500 can be selected, i.e., if processing conforming to the color array, color depth and palette associated with the image object 502 for which printing has been requested is possible, the content of the image object 502 does not exhibit redundancy, the color array, color depth and palette are supported by the printer 1500 and there is no problem in terms of processing speed, then the image object 502 may be transferred to the printer 1500 as is.

However, if there is problem with any of these conditions, then control means having a format that matches the content of the image object 502 in the printer 1500 is not selected;

other control means is selected instead. For example, even if the depth of the data of image object 502 is too great in comparison with the content of these image data, e.g. even if it is clear that the numbers of elements in the histograms 510, 511 are very small, there are cases where the image object 502 uses control information of a format capable of expressing a larger number of elements. If the printer 1500 supports the format of this number of elements and there is no problem in terms of processing speed in this case, the host computer 3000 creates image data having a data format in which the number of elements is reduced and changes other control information such as image width and height correspondingly, thereby constructing control information 506 transmitted to the printer 1500.

In a case where the number of palettes of the image object 502 is excessive, i.e. if, in view of the histogram 511, the initial several palettes include different color values but the color values included in latter palettes are all the same, or if palettes include different color values but only several palettes are used by the image object 502, then the number of palettes and image data of a format in which the most redundancy can be excluded within the limits supportable by the printer 1500 are created, and other control information such as color arrays and depths is changed accordingly, thereby constructing the control information 506 transmitted to the printer 1500. Thus, in a case where, say, the number of palettes is excessive, new palettes are created, other control information is changed accordingly and the control information 506 thus constructed is transmitted to the printer 1500, which proceeds to execute printing processing.

When the control information 506 transmitted to the printer 1500 is constructed, the printer control program 500 transfers confirmation request information, onto which the provisionally constructed control information (which does not include data of the actual image object 502) has been added, to the printer 1500 via the PRTC 8. As a result, the printer 1500 processes the composition of the received control information as well as the information obtained from the external memory 14 or the RAM 19, and transfers discriminating information, which indicates whether the provisionally constructed control information is allowed or not, as discriminating control information to the host computer 3000 via the HSTC 18.

When printer control program 500 receives this discriminating control information and judges that the content thereof does not indicate any problem with regard to the printer 1500, the program 500 actually starts constructing the control information 506. On the other hand, if it is judged that there is a problem (i.e. that the provisionally constructed control information is not allowed), then processing for changing this control information is executed.

Even if printer control information 506 that is optimum as far as the printer 1500 and image object 502 are concerned cannot be constructed (a judgment to effect that the information is optimum for neither of them is possible), processing control information for both will have been assembled. Therefore, by controlling balance suitably with regard to the printer 1500 or image object 502, the printer control program 500 is capable of constructing printer control information 506 that is optimum for the overall printing system.

Thus, the printer control program 500 constructs the control information 505 of the printer 1500 by using the discriminating control information of the image processing control information program as well as the results of analyzing the content of the image object 502. The printer control information 506 constructed by the printer control program 500 causes the configuration and capabilities of the printer 1500 to be reflected in the image object 502 accurately and with little redundancy.

As a result, optimum control information 506 can be constructed on the side of the host computer in the printing system of this embodiment. Further, processing in which the relative situations of the host computer 3000 and printer 1500 in the concept described thus far are reversed (i.e. in which the printer 1500 constructs the control information of the host computer 3000 rather than vice versa) also is possible.

Figure 6:
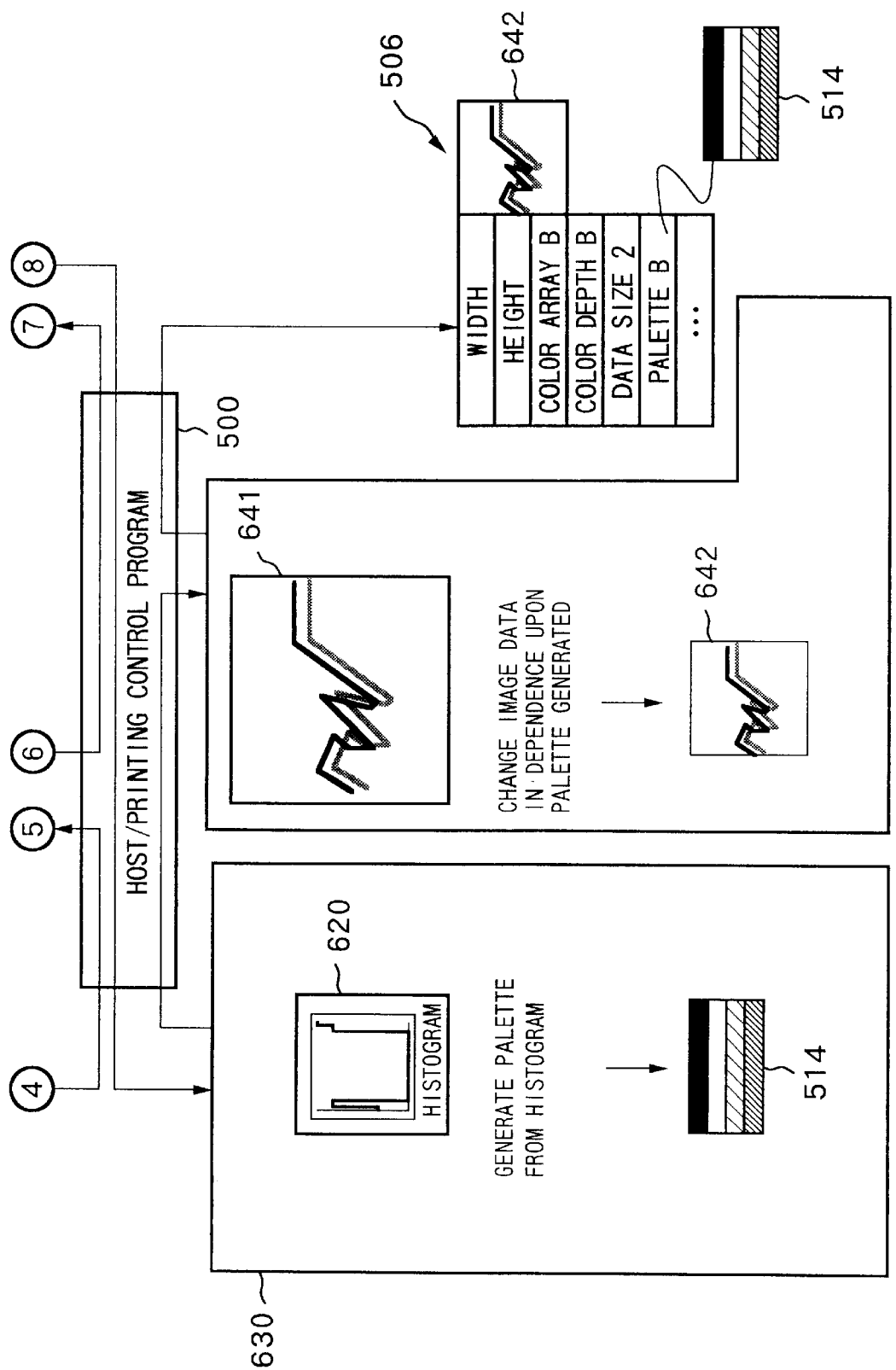
Figure 7:
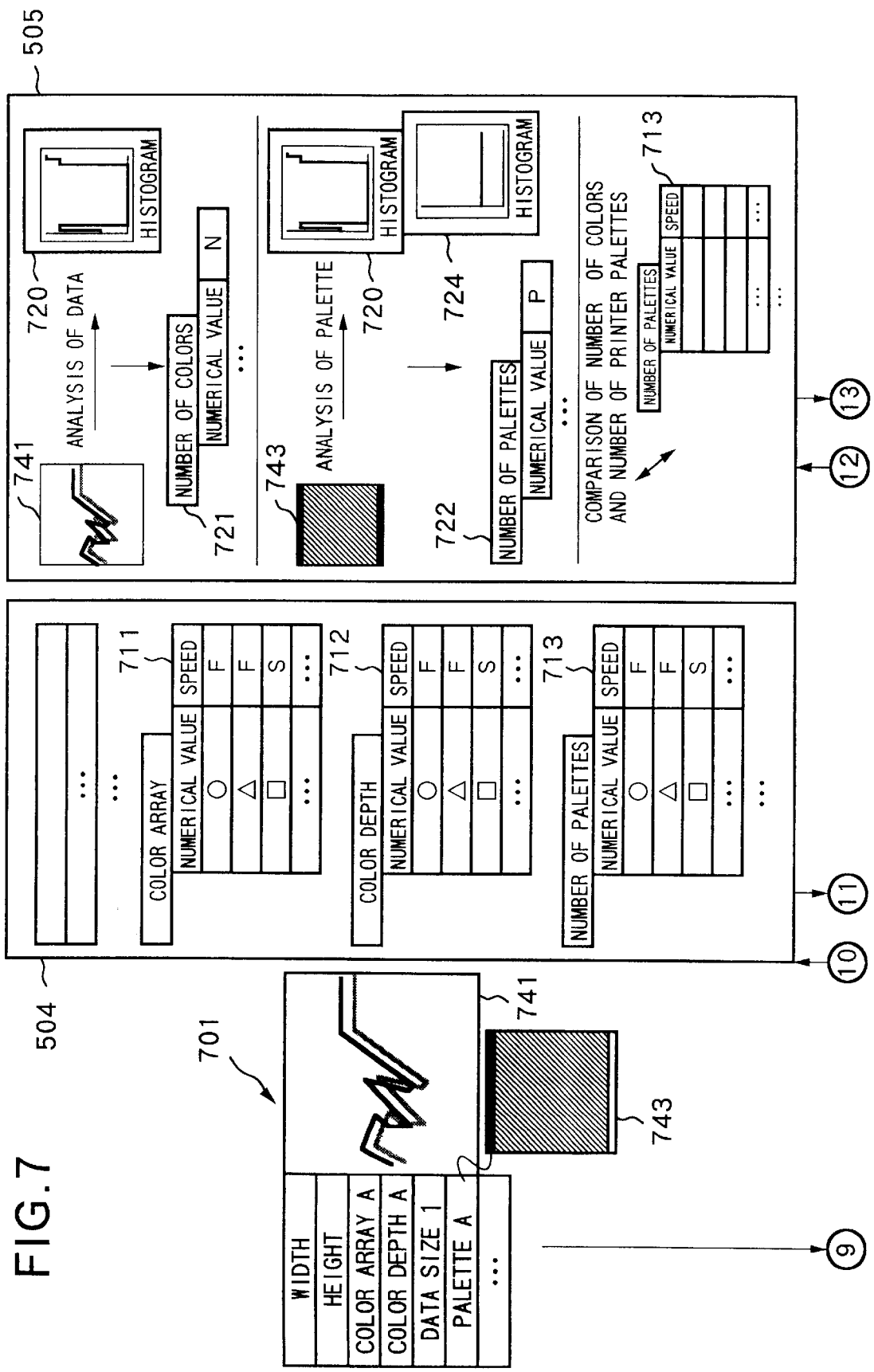
FIGS. 7 and 8 are conceptual views showing the general principles of 8-bit palette-image processing in the printing system of this embodiment.
Figure 8:
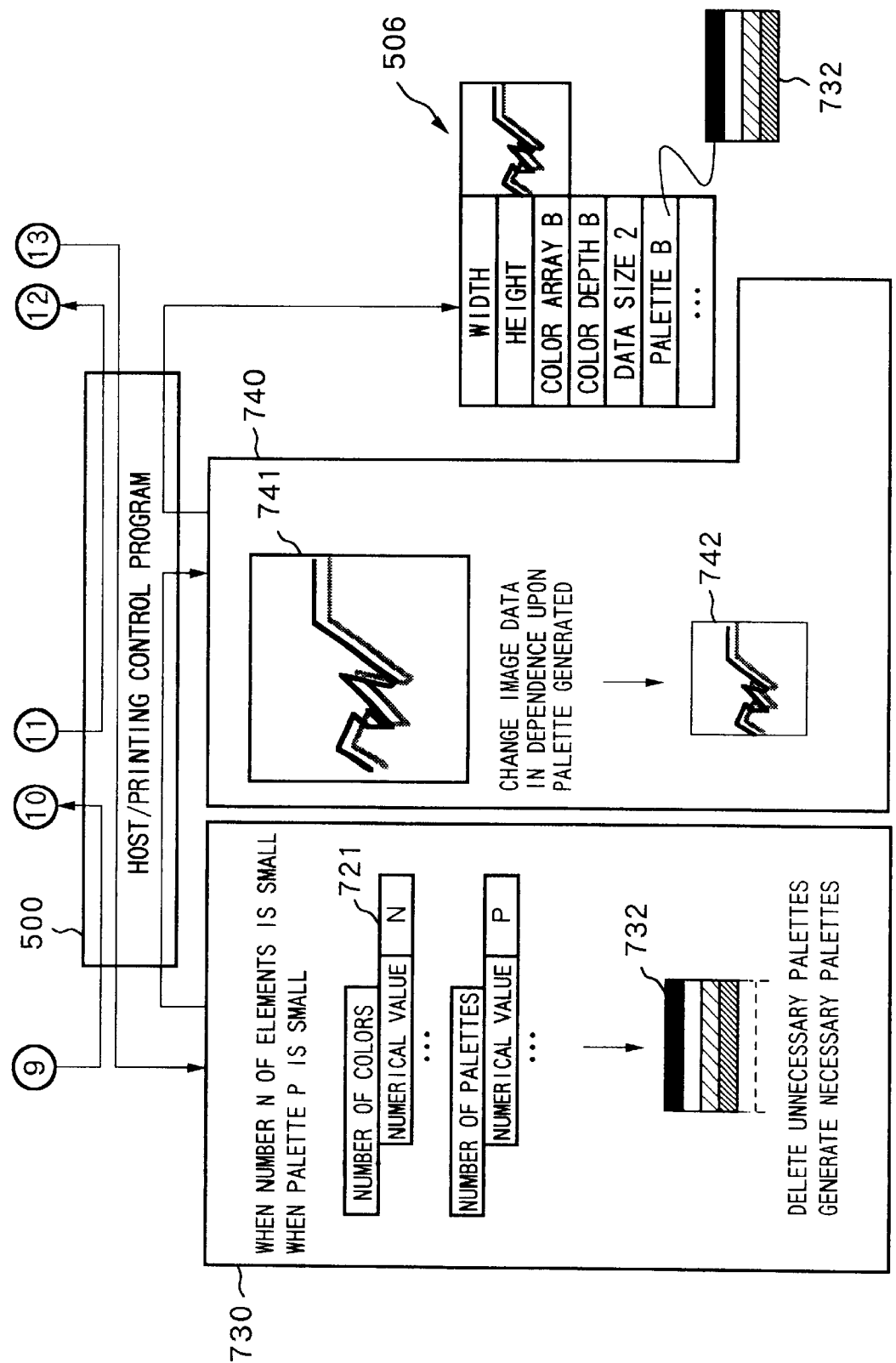

FIGS. 5 through 8 are conceptual views illustrating the principle of the processing described above, in which FIGS. 5 and 6 are the case for a 24-bit image and FIGS. 7 and 8 are for an 8-bit palette image.

The situation in the case of the 24-bit image will now be described with reference to FIGS. 5 and 6.

Figure 5:
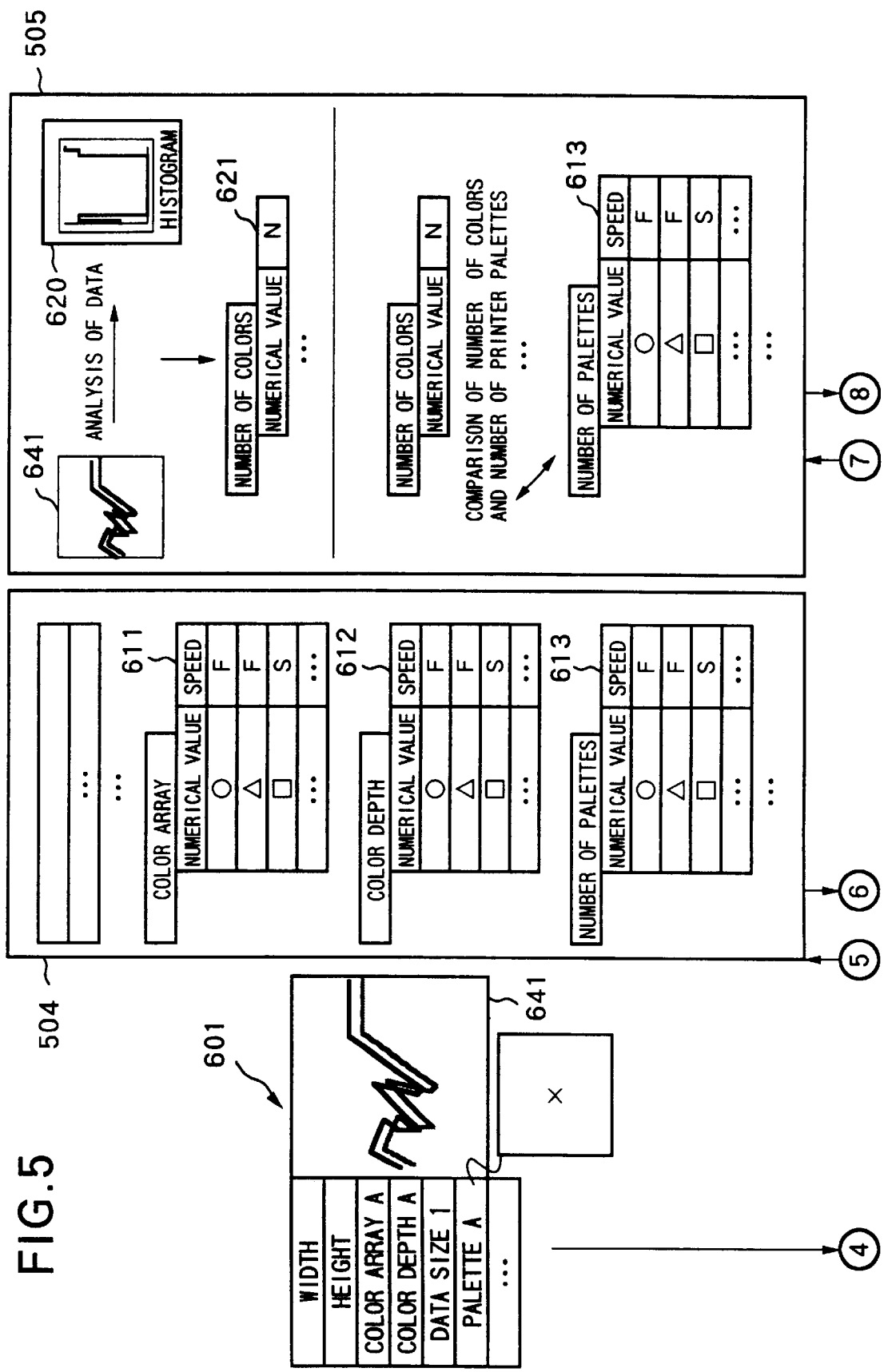
FIGS. 5 and 6 are conceptual views showing the general principles of 24-bit bit-image processing in the printing system of this embodiment.

A bit-image object of 24 bits is indicated at 601 in FIG. 5. The image object 601 is delivered from an application program to the printer control program 500. Since the image object 601 is a bit image, there is no palette and a color array A, color depth A and data size 1 have been specified.

First, the host computer 3000 transmits an image processing data request 503 to the printer 1500 and receives a response, namely the control information group 504. Information relating to a color array 611, color depth 612 and palette count 613 supported by the printer 1500 has been set in the control information group 504, as mentioned above. These items of information include information such as the respective numerical values, processing speeds, etc.

Next, the host computer 3000 analyzes the image object 601. This analysis is indicated at 505 (FIG. 5). Based upon the image data 641 of the image object 601, the host computer 3000 creates a histogram 620 and obtains the number N of colors (indicated at 621). Here it is assumed that the value of the number N of colors is "4". This is compared with data 613 relating to the palette count obtained from the printer 1500. If the printer 1500 supports "4" as the number of colors, there is no problems in terms of the processing speed thereof and color depth are supported with two bits, a change is made to a two-bit palette image to construct the printer control information 506 (FIG. 6). Thus, a palette 514 is generated from the histogram 620, as indicated at 630. The image data 641 of the image object 601 are changed in dependence upon the palette 514, thereby generating two-bit image data 642. Though the printer control information 506 is constructed in dependence upon the palette 514 and image data 642 thus generated, in this example the data such as the color array, color depth, data size and palette differ from that of the image object 601.

The situation in the case where the image object is the 8-bit palette image will now be described with reference to FIGS. 7 and 8.

The 8-bit palette image object 701 is delivered to the printer control program 500 by an application program. Since the image object 701 is a palette image, it possesses information 743 of the palette A. The set information is color array A, color depth A and data size 1. In this case, first the image data processing request 503 is transmitted to the printer 1500 and the control information group 504 (FIG. 7) is received from the printer 1500 as the response, just as in the manner described above. As a result, information such as color array 711, color depth 712 and palette count 713 supported by the printer 1500 is received. These items of information include information such as the respective numerical values, processing speeds, etc.

Next, the printer control program 500 analyzes the image data 741 in the image object 701. This processing is indicated at 505 (FIG. 7). Here a histogram 720 is created from the image data 741 and the number N of colors (indicated at 721) is obtained. Further, a histogram 724 is created from a palette 743 included in the image object 701 and the number P (indicated at 722) of palettes is obtained. At this time overlapping portions of these two histograms are taken into consideration (though the palettes have entries, the entries are not included in the number of palettes in a case where the entries do not appear in the image data). It is assumed here that the value of the number N (indicated at 721) of colors is "4" and that the number P (indicated at 722) of palettes is "4".

At this time a comparison is made with the data 713 indicative of the number of palettes obtained from the counter 1500 and it is determined whether the palette count "4" is supported, whether there is no problem in terms of speed and whether two bits are supported with regard to color depth as well. If the answer is affirmative, then a change is made to a 2-bit palette image to construct printer control information 506 (FIG. 8). Here a palette 732 is generated from the number of colors and number of palettes at 730. The image data 741 of the image object 701 are changed in conformity with the palette 732 to generate 2-bit image data 742. Though the printer control information 506 is constructed in dependence upon the palette 732 and image data 742 thus generated, the color array, color depth, data size and palette differ from those of the image object 701 applied to the printer control program 500.

Figure 9:
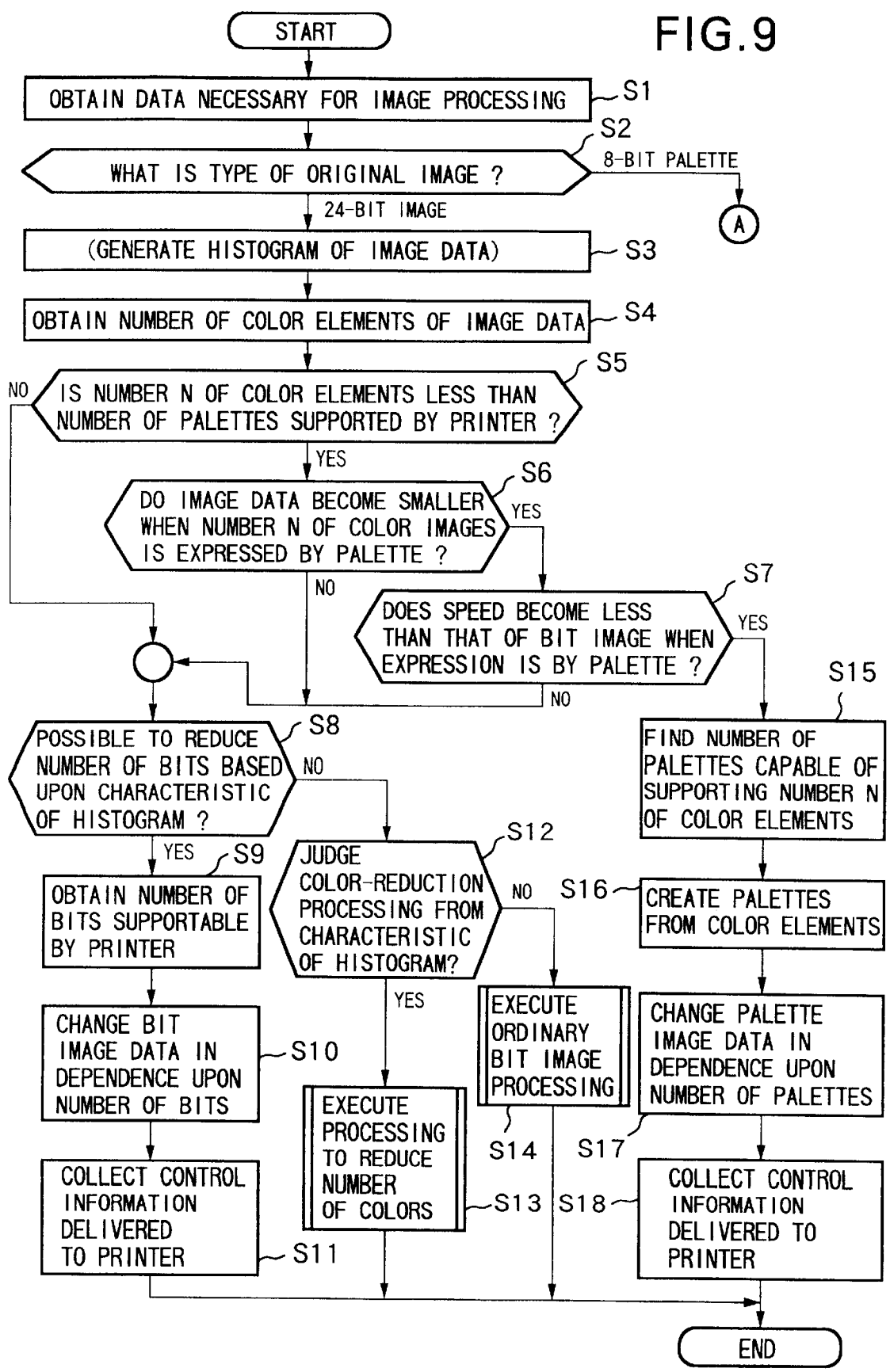
FIG. 9 is a flowchart focusing mainly on a procedure for processing 24-bit image data in a printer control system according to this embodiment.
Figure 10:
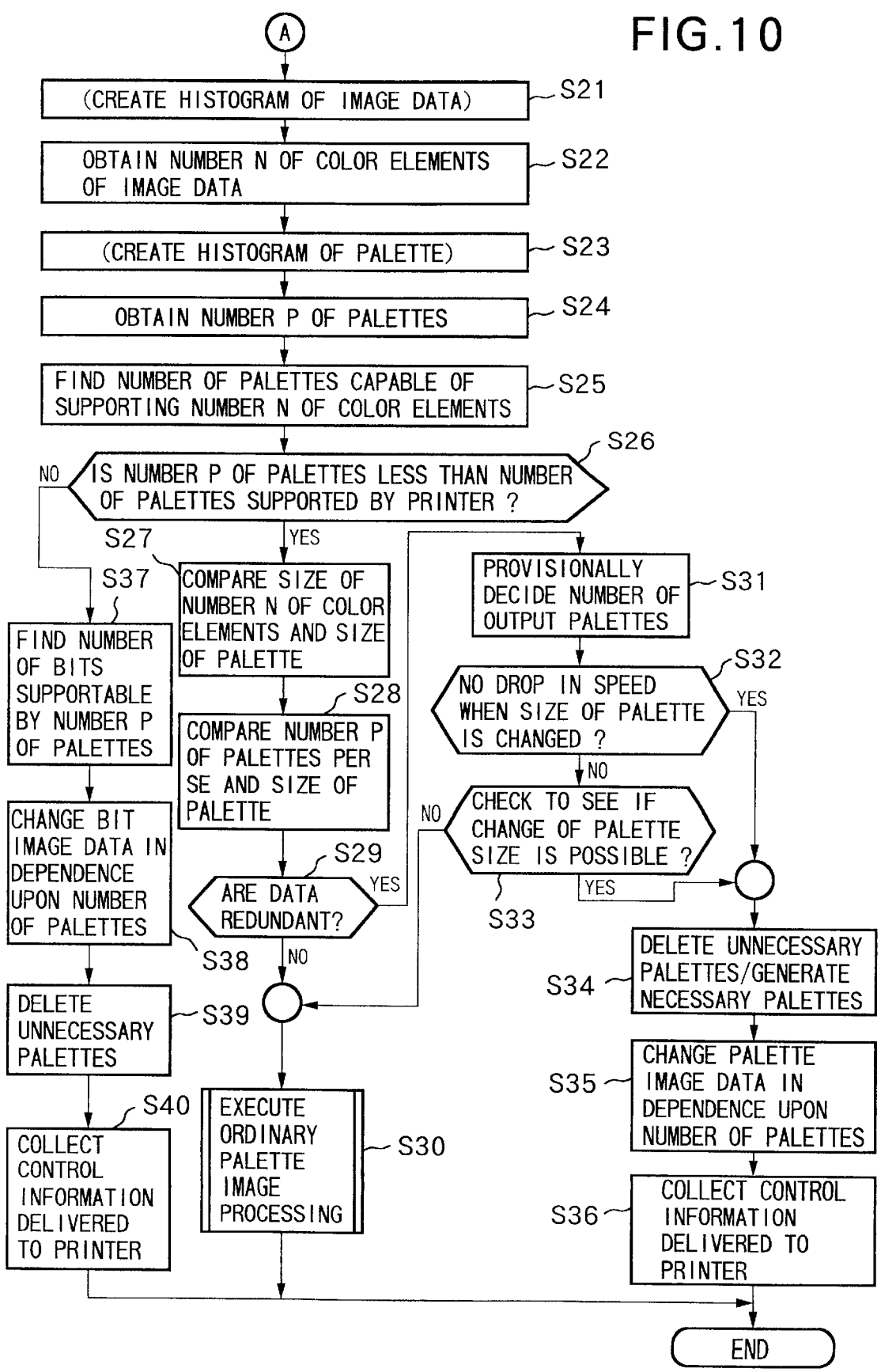
FIG. 10 is a flowchart focusing mainly on an example of a procedure for processing 8-bit palette data in a printer control system according to this embodiment.

FIGS. 9 and 10 are flowcharts illustrating processing by the printing control program 500 of this embodiment.

When a request to print an image object is issued by an application program or the like at step S1, the image processing data request 503 is sent to the printer 1500, in response to which the control information group 504 sent back from the printer 1500 is received. The program then proceeds to step S2, at which the type of image object is discriminated and processing is changed over accordingly. That is, it is determined whether the image object is a bit image of 24 bits or a palette data of eight bits. The program then proceeds to step S3 in case of a 24-bit image and to step S21 (FIG. 10) in case of 8-bit palette data.

A histogram (e.g. 620 in FIG. 5) of the image data included in this image object is created at step S3 and the number of color elements (indicated at 621) of this image data is obtained at step S4. This is followed by step S5, at which it is determined whether the number of color elements obtained is less than the number of palette colors supported by the printer 1500. If the answer is "YES", the program then proceeds to step S6, at which it is determined whether the image data becomes smaller when the color elements are expressed by this palette. If the answer is "YES", then the program proceeds to step S7, at which it is determined whether the processing speed drops when the color elements are expressed by this palette.

If the processing speed drops, the program proceeds to step S15, at which the number of palettes capable of supporting these color elements is found, and to step S16, at which palettes are created from these color elements. The program then proceeds to step S17, at which the image data are changed in dependence upon the palettes thus created, and then to step S18, at which the control information 506 transferred to the printer 1500 is constructed.

If a "NO" decision is rendered at any of the steps S5~S7, then the program proceeds to step S8, at which the characteristic of the histogram created at step S3 is investigated to determine whether it is possible to reduce the number of bits per se. If this is possible, the program proceeds to step S9, at which the number of bits capable of being supported by the printer is obtained, and then to step S10, at which the bit image data are changed in dependence upon the number of bits. This is followed by step S11, at which the control information transferred to the printer 1500 is constructed.

Though it is additional processing, processing for reducing the number of colors based upon the histogram may be executed. Specifically, it is determined at step S8 whether it is possible to reduce the number of bits per se. If the answer is "NO", the program proceeds to step S12, at which it is determined whether the histogram has a characteristic suited to reduction of the number of colors. If the answer is "YES", then the program proceeds to step S13, and which color reduction processing is executed. If the decisions rendered at both steps S8 and S12 are "NO", the program proceeds to step S14, at which ordinary bit-image processing is executed.

If the decision rendered at step S2 is that the input image object is an 8-bit palette image, the program proceeds to step S21 in FIG. 10. A histogram (e.g. 720 in FIG. 7) of the input image data is created at step S21, and the number N of color elements of this image data is obtained at step S22. The program then proceeds to step S23, where the histogram (724 in FIG. 7, by way of example) of the palette is created, and then to step S24, at which the number P of palettes is obtained. This is followed by step S25, at which the number of palettes capable of supporting these color elements is found.

It is determined at step S26 whether the number P of palettes obtained at step S25 is larger than the number of palettes supported by the printer 1500. If P is greater than this number of palettes, then the program proceeds to step S37, at which the number of bits supportable by the number of palettes of the printer 1500 is found. This is followed by step S38, at which the image data are changed in dependence upon the number of palettes. Since the conversion to a bit image is thus completed, the program proceeds to step S39, where unnecessary palettes are deleted, and then to step S40, at which the control information 506 transferred to the printer 1500 is constructed.

When it is determined at step S26 that the number P of palettes is smaller than the number of palettes supported by the printer 1500, the program proceeds to step S27. Here the number N of colors found at step S22 is compared with the size of the palette. This is followed by step S28, at which the number P of palettes found at step S24 is compared with palette size. In other words, it is determined whether there is a palette entry (whether a color exists in the palette) and whether colors identical with those of other palettes are duplicated. If so, the palette is a needless palette. This is followed by step S29, at which it is determined based upon the comparisons of steps S27 and S28 whether the data of the image object are redundant. If the data are redundant, the program proceeds to step S31, at which the number of output palettes is provisionally decided. This is followed by step S32, at which it is determined whether there is no drop is processing speed even if the size of the palette is changed. If changing the palette size brings about a decrease in speed, then the program proceeds to step S33, at which it is determined whether it is possible to change the size of the palette.

In a case where it is found at step S32 that there will be no decrease in speed even when the size of the palette is changed, or if it is determined at step S33 that the generation of a palette is possible, then the program proceeds to step S34, at which a necessary palette is generated and an unnecessary palette deleted (indicated at 732 in FIG. 8). Palette image data (indicated at 742 in FIG. 8, for example) are generated in dependence upon the palette at step S35, and the palette image control information 506 transferred to the printer 1500 is constructed at step S36.

If a "NO" decision is rendered at step S29 or step S33, the program proceeds to step S30, at which ordinary palette image creation processing is executed.

In the embodiment set forth above, a case is described in which the printer 1500 and the host computer 3000 are connected via a cable so as to be capable of communicating in both directions. However, in case of a bidirectional interface, it goes without saying that this embodiment is applicable irrespective of whether the interface is a wired or wireless interface.

Figure 11:
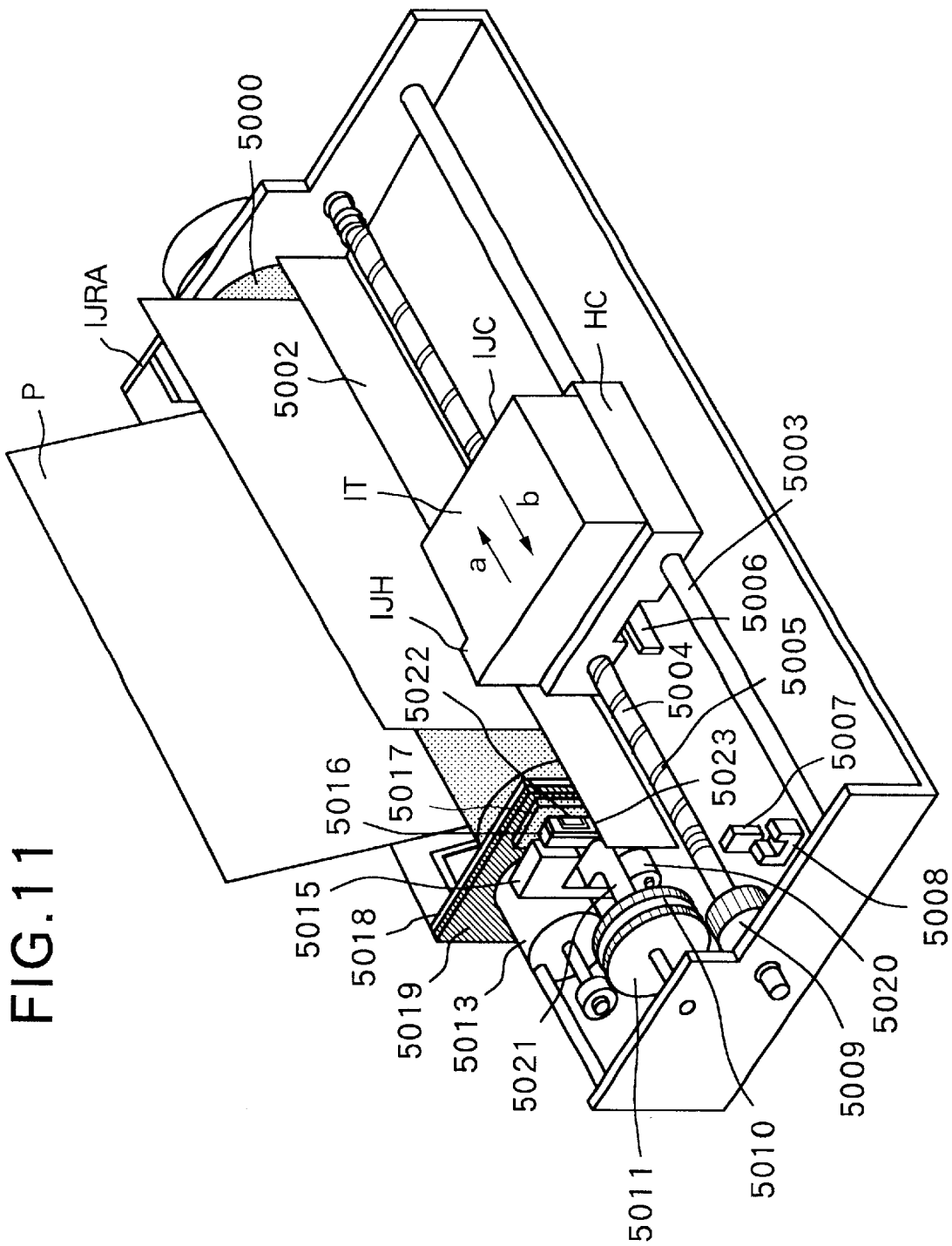
FIG. 11 is an external perspective view showing the construction of a recording unit in an inkjet printer exemplifying an output apparatus according to this embodiment.

FIG. 11 is a diagram illustrating another embodiment of a printer apparatus applicable to the present invention. This shows an inkjet recording apparatus (IJRA).

As shown in FIG. 11, a carriage HC is engaged with a helical groove 5004 of a lead screw 5005 rotated via driving force transmission gears 5011, 5009 inoperative association with the forward and reverse rotation of a driver motor 5013. The carriage HC has a pin (not shown) moved back and forth in directions of arrows a and b. An inkjet cartridge IJC is mounted on the carriage HC. Paper retaining plate 5002 presses recording paper P against a platen 5000 along the traveling direction of the carriage. Photocouplers 5007, 5008 constitute home position sensing means for verifying the presence of a carriage lever 5006 in the vicinity of the photocouplers and for changing over the direction in which the motor 5013 is rotated. A member 5016 supports a cap member 5022, which is for capping the front side of the recording head. Suction means 5015 for applying suction to the cap subjects the cap to suction recovery via an opening 5023 inside the cap. A cleaning blade 5017 is capable of being moved back and forth by a member 5019. The cleaning blade 5017 and the member 5019 are supported on a support plate 5018. A lever 5012, which is for starting the suction of the suction recovery operation, moves with movement of a cam 5020 engaged with the carriage. Movement is controlled by well-known transmission means whereby the driving force from the driver motor is changed over as by a clutch.

These capping, cleaning and suction recovery operations are carried out at the corresponding positions by the action of the lead screw 5005 when the carriage has arrived in an area on the side of the home position. However, it is so arranged that desired ones of these operations are carried out timings that are well known, such an arrangement will also be applicable to this embodiment.

Figure 12:
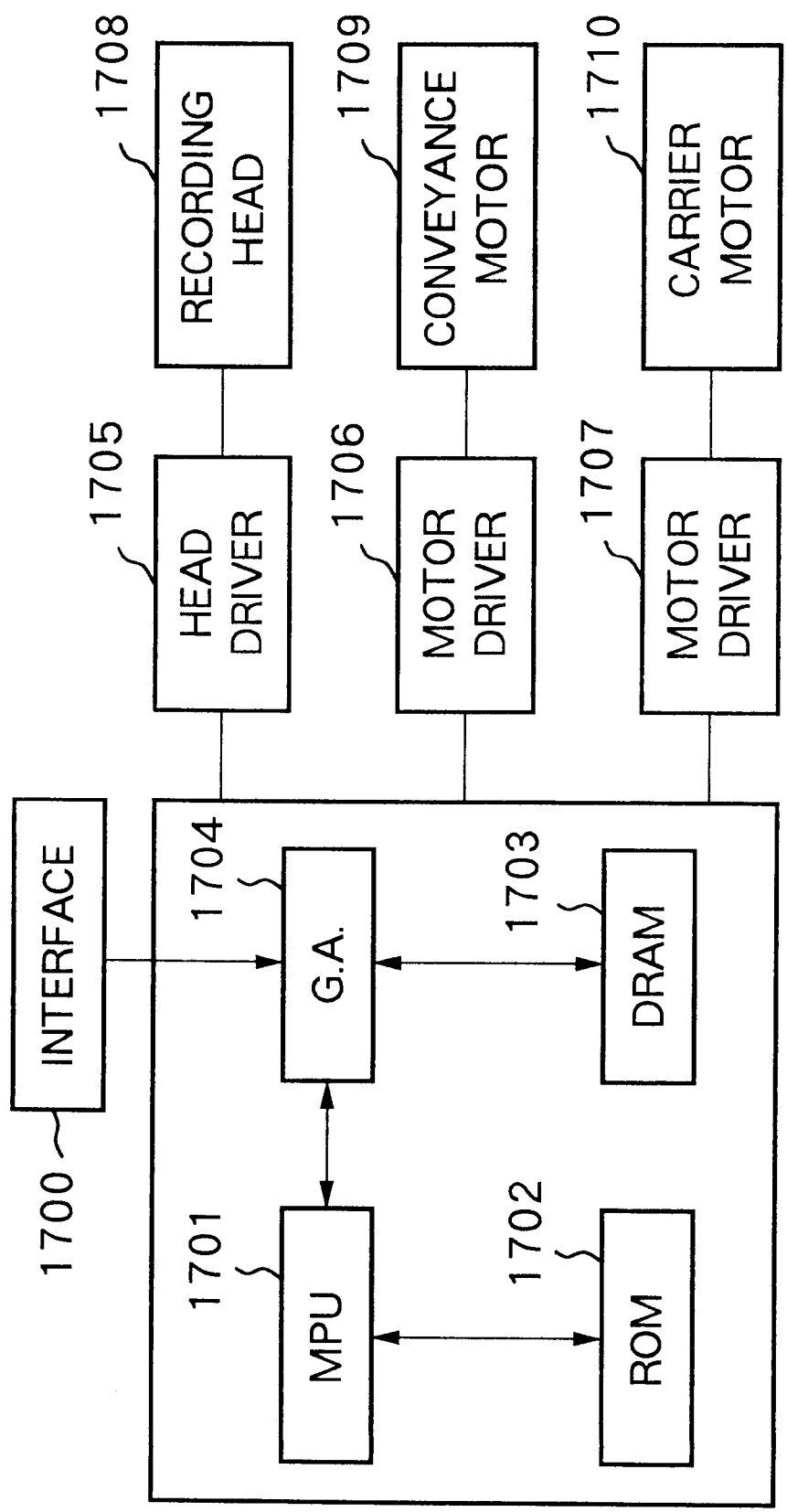
FIG. 12 is a block diagram showing the construction of an inkjet printer according to this embodiment.

FIG. 12 is a block diagram for describing the control components of the printer apparatus shown in FIG. 11.

Shown in FIG. 12 are an interface 1700 for entering a recording signal from the host computer 3000, an MPU 1701, a ROM 1702 for storing a control program executed by the MPU as well as host printing information, etc., a DRAM 1703 for saving various data (the above-mentioned recording signal as well as recording data supplied to a recording head), a gate array 1704 for controlling the supply of output data to a recording head 1708, i.e. for controlling the transfer of data between the interface 1700 and the MPU 1701 and DRAM 1703, a carrier motor 1710 for transporting the recording head 1708, a conveyance motor 1709 for conveying recording paper, a paper driver 1705 for driving the recording head, a motor driver for driving the conveyance motor 1709, and a motor driver 1707 for driving the carrier motor 1710.

When input information enters from the host computer 3000 via the interface 1700 in the recording apparatus constructed as set forth above, the input information is converted to printing output information between the gate array 1704 and MPU 1701. The motor drivers 1706, 1707 are driven and the recording head is driven in accordance with the output information sent to the head driver 1705, as a result of which printing is executed. The MPU 1701 is capable of performing communication processing with the host computer 3000 via the interface 1700. The arrangement is such that the host computer 3000 is capable of being notified of memory information and resource data relating to the DRAM 1703 and of host printing information in the ROM 1703.

Figure 13:
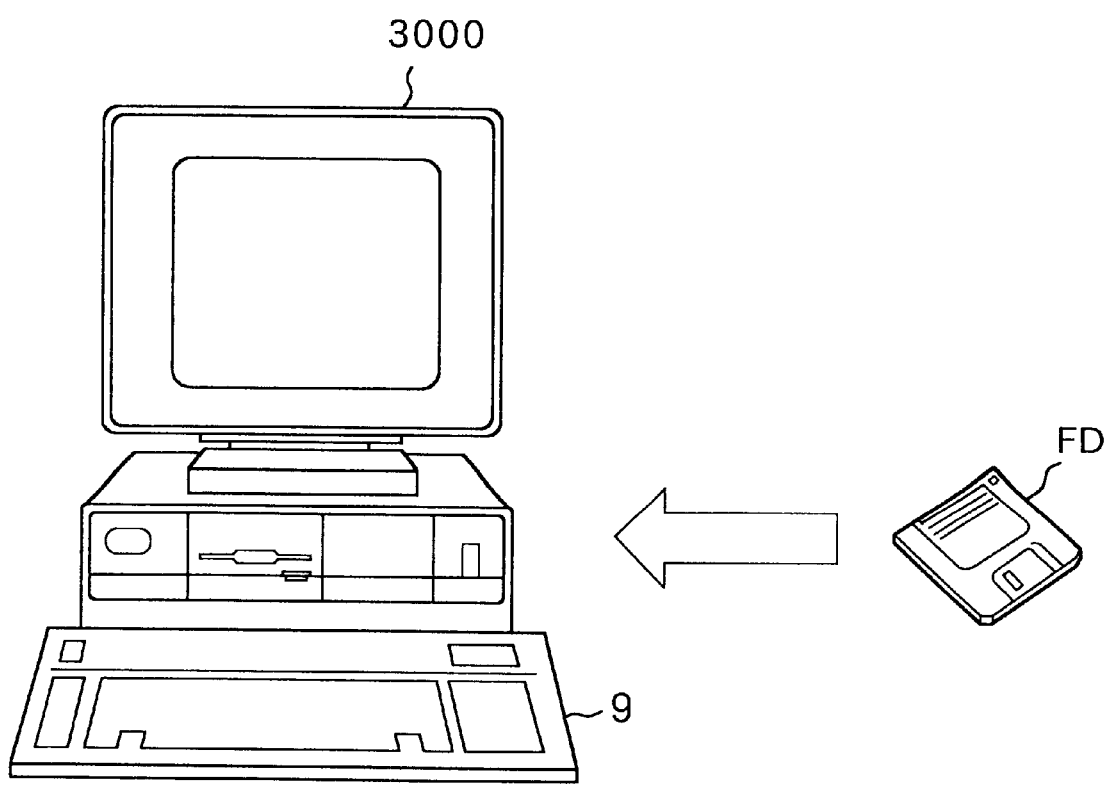
FIG. 13 is a diagram showing the manner in which a control program according to this embodiment is downloaded to a host computer.

FIG. 13 is a conceptual view showing the manner in which a floppy disk (FD) serving as the external memory 11 is loaded in the host computer 3000 of this embodiment to supply the host computer 3000 with a program that has been stored on the disk.

Figure 14:
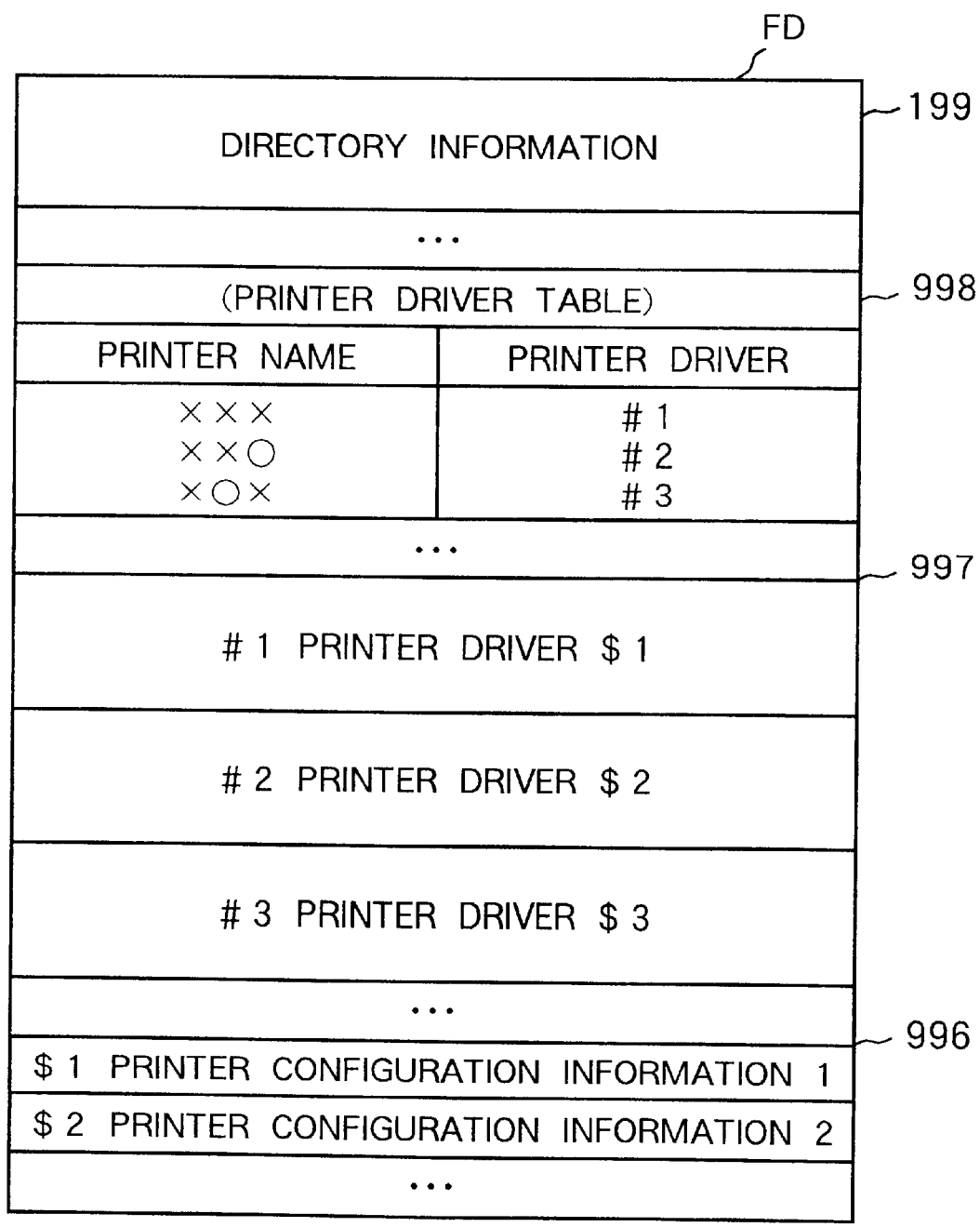
FIG. 14 is a diagram showing a memory map of a storage medium in the printer control system of this embodiment.

FIG. 14 is a diagram showing a memory map of the floppy disk, namely the storage medium, of FIG. 13.

Shown in FIG. 14 is an area 199 storing directory information. This indicates the storage location of a printer driver table 998. The directory information further indicates a storage area 997 storing a program for controlling the printer 1500 shown in FIGS. 9 and 10, for example, and a storage area 996 storing configuration information indicative of the printer 1500. These storage areas correspond to respective printers and printer drivers. The operator of the host computer 3000 uses the keyboard 9 to designate the name of the printer desired to be installed from the particular storage area of the above-mentioned floppy disk, whereby the program and configuration information are loaded with reference being had to the table 998. For example, if a printer name "XXX" has been designated, the program and configuration information (stored in areas 997 and 998, respectively) corresponding to the printer "XXX" can be loaded into the host computer 3000.

The present invention can be applied to a system constituted by a plurality of devices or to an apparatus comprising a single device. Further, it goes without saying that the present invention can also be applied to a case where the invention is implemented by supplying a system or apparatus with a program. In such case a storage medium storing the program would constitute the invention. The system or apparatus would be made to operate in the predetermined manner by reading the program from the storage medium to the system or apparatus.

Further, the object of the present invention can also be achieved by providing a storage medium on which the program codes of software which implements the functions of the foregoing embodiment to a system or an apparatus, reading the program codes with a computer (e.g., a CPU or MPU) of the system or apparatus from the storage medium, and then executing the program. In this case, the program codes read from the storage medium themselves implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system (OS) or the like working on the computer performs a part of or the entire process in accordance with the designation of program codes and implements the functions according to the embodiment.

Furthermore, the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiments.

In accordance with the embodiment described above, an original image can be transferred to an output apparatus as is if the content of the image is highly efficient.

Further, in accordance with the embodiment, transferred content can be constructed in conformity with the content of the image and selection of format can be performed automatically.

Further, in accordance with the embodiment, data necessary for format selection can be obtained from an output apparatus and control conforming to the output apparatus can be performed.

The present invention is not limited to the above embodiment and various changes and modifications can be made within the spirit and scope of the present invention. Therefore, to apprise the public of the scope of the present invention, the following claims are made.

What is claimed is:

1. An output control method for outputting image data to an output unit, comprising:

an input step of inputting first color palette data and image data represented by using the first color palette data;

an analyzing step of analyzing the image data inputted in said input step and obtaining a number of color elements of the image data;

a palette analyzing step of analyzing the first color palette data and determining a number of entries of the first color palette data corresponding to the color elements of the image data;

a palette generation step of generating second color palette data based on the number of color elements of the image data and the number of entries determined in said palette analyzing step; and a data conversion step of converting the image data into second image data represented by using the second color palette data.

2. The method according to claim 1, wherein said analyzing step includes creating a histogram based on the image data and obtaining the number of color elements of the image data from the histogram.

3. The method according to claim 1, further comprising an acquiring step of acquiring a number of color palettes for representing the number of color elements, and wherein selectively the image data is converted into the second image data in said data conversion step by using color palette data having the number of color palettes acquired in said acquiring step.

4. The method according to claim 3, wherein the image data is converted into the second image data in said data conversion step by using the color palette data having the number of color palettes acquired in said acquiring step in a case in which the output unit supports the number of color palettes.

5. The method according to claim 4, further comprising an output determining step of determining whether the output unit supports the number of color palettes by determining whether the output unit can output color elements corresponding to the number of palettes, and wherein the image data is converted into the second image data in said data conversion step by using the color palette data having the number of color palettes in a case in which it is determined in said output determining step that the output unit supports the number of color palettes.

6. The method according to claim 1, further comprising an information creating step of creating control information to be transferred to the output unit based upon the second image data converted from the image data in said data conversion step.

7. The method according to claim 6, further comprising a transferring step of transferring the control information created in said information creating step to the output unit.

8. The method according to claim 1, further comprising an interrogating step of interrogating the output unit about processing functions possessed by the output unit.

9. An output control apparatus for outputting image data to an output unit, comprising:

input means for inputting first color palette data and image data represented by using the first color palette data;

analyzing means for analyzing the image data inputted by said input means and obtaining a number of color elements of the image data;

analyzing means for analyzing the first color palette data and determining a number of entries of the first color palette data corresponding to the color elements of the image data;

generating means for generating second color palette data based on the number of color element of the image data and the number of entries determined by said analyzing means; and data conversion means for converting the image data into second image data represented by using the second color palette data.

10. The apparatus according to claim 9, wherein the output control apparatus is a host computer.

11. The apparatus according to claim 9, wherein the output unit is a printer.

12. The apparatus according to claim 9, wherein the output unit is a laser beam printer.

13. A storage medium storing a program for executing an output control method of outputting image data to an output unit, the program stored by said storage medium comprising:

an input module to input first color palette data and image data represented by using the first color palette data;

an analyzing module to analyze the image data and to obtain a number of color elements of the image data;

a palette analyzing module to analyze the first color palette data and to determine a number of entries of the first color palette data corresponding to the color elements of the image data;

a generating module to generate second color palette data based on the number of color elements of the image data and the number of entries determined by said palette analyzing module; and a conversion module to convert the image data into second image data represented by using the second color palette data.

14. A program product embodying program codes for performing an output control method of outputting image data to an output unit, said output control method comprising:

an input step of inputting first color palette data and image data represented by using the first color palette data;

an analyzing step of analyzing the image data inputted in said input step and obtaining a number of color elements of the image data;

a palette analyzing step of analyzing the first color palette data and determining a number of entries of the first color palette data corresponding to the color elements of the image data;

a palette generation step of generating second color palette data based on the number of color elements of the image data and the number of entries determined in said palette analyzing step; and a data conversion step of converting the image data into second image data represented by using the second color palette data.

15. An output control method for outputting image data to an output unit, comprising:

an input step of inputting first color palette data and image data represented by using the first color palette data;

a palette analyzing step of analyzing the first color palette data and determining a number of entries corresponding to the color elements of the image data, except for redundant entries of the first color palette data;

a palette generation step of generating second color palette data based on the number of entries of the first color palette data determined in said palette analyzing step; and a data conversion step of converting the image data into second image data represented by using the second color palette data.

16. A storage medium storing a program for executing an output control method of outputting image data to an output unit, the program stored by said storage medium comprising:

an input module to input first color palette data and image data represented by using the first color palette data;

an analyzing module to analyze the first color palette data and to determine a number of entries corresponding to the color elements of the image data, except for redundant entries of the first color palette data;

a generation module to generate second color palette data based on the number of entries of the first color palette data determined by said analyzing module; and a conversion module to convert the image data into second image data represented by using the second color palette data.

* * * * *